(12) United States Patent
Jensen et al.

(10) Patent No.: US 9,317,043 B2
(45) Date of Patent: Apr. 19, 2016

(54) PATH BASED POWER GENERATION CONTROL FOR AN AERIAL VEHICLE

(71) Applicant: Google Inc., Mountain View, CA (US)

(72) Inventors: Kenneth Jensen, Berkeley, CA (US); Damon Vander Lind, Alameda, CA (US)

(73) Assignee: Google Inc., Mountain View, CA (US)

( * ) Notice: Subject to any disclaimer, the term of this patent is extended or adjusted under 35 U.S.C. 154(b) by 224 days.

(21) Appl. No.: 14/134,825

(22) Filed: Dec. 19, 2013

(65) Prior Publication Data

US 2015/0175262 A1 Jun. 25, 2015

(51) Int. Cl.
| | |
|---|---|
| *G05D 1/00* | (2006.01) |
| *F03D 9/00* | (2006.01) |
| *G05D 1/10* | (2006.01) |
| *B64C 31/06* | (2006.01) |
| *B64C 39/02* | (2006.01) |
| *F03D 7/00* | (2006.01) |
| *G05D 1/08* | (2006.01) |

(52) U.S. Cl.
CPC .............. *G05D 1/101* (2013.01); *B64C 31/06* (2013.01); *B64C 39/022* (2013.01); *F03D 7/00* (2013.01); *F03D 9/002* (2013.01); *G05D 1/0866* (2013.01); *F05B 2240/921* (2013.01)

(58) Field of Classification Search
CPC B64C 39/022; B64C 31/06; B64C 2201/148; A63H 27/04
USPC ............................................ 701/3; 290/44, 55
See application file for complete search history.

(56) References Cited

U.S. PATENT DOCUMENTS

| | | | | |
|---|---|---|---|---|
| 4,166,596 A | * | 9/1979 | Mouton, Jr. ............... | B64B 1/50 244/30 |
| 6,254,034 B1 | | 7/2001 | Carpenter | |
| 7,109,598 B2 | * | 9/2006 | Roberts ................... | F03D 1/001 290/44 |
| 7,183,663 B2 | * | 2/2007 | Roberts ................... | F03D 11/04 290/44 |
| 7,317,261 B2 | * | 1/2008 | Rolt ...................... | B64C 39/022 244/24 |
| 7,456,515 B2 | * | 11/2008 | Nielsen ................. | B63B 21/502 290/55 |

(Continued)

FOREIGN PATENT DOCUMENTS

| | | |
|---|---|---|
| WO | 2010135604 A2 | 11/2010 |
| WO | 2013049732 A1 | 4/2013 |

OTHER PUBLICATIONS

International Search Report and Written Opinion of International Application No. PCT/US2014/061386 dated Jan. 27, 2015 (mailed Jan. 27, 2015).

*Primary Examiner* — Thomas G Black
*Assistant Examiner* — Tyler Paige
(74) *Attorney, Agent, or Firm* — McDonnell Boehnen Hulbert & Berghoff LLP

(57) ABSTRACT

Methods and systems described herein relate to power generation control for an aerial vehicle. An example method may include operating an aerial vehicle in a crosswind-flight orientation substantially along a first flight path to generate power. The first flight path may include a substantially circular path that allows the aerial vehicle to generate the power. While the aerial vehicle is in the crosswind-flight orientation the method may include determining to reduce the power being generated by the aerial vehicle, and responsive to the determination, determining a second flight path that will reduce the power generated by the aerial vehicle when operating on the second flight path. Once determined, the aerial vehicle may operate substantially along the second flight path.

20 Claims, 8 Drawing Sheets

(56) References Cited

U.S. PATENT DOCUMENTS

| | | | |
|---|---|---|---|
| 7,602,077 B2 * | 10/2009 | Ferguson | F03D 3/002 290/44 |
| 7,786,610 B2 * | 8/2010 | Potter | F03D 1/04 290/55 |
| 7,861,973 B1 | 1/2011 | Olson | |
| 8,018,079 B2 * | 9/2011 | Kelly | F03D 5/04 290/1 R |
| 8,066,225 B1 * | 11/2011 | Tigner | F03D 5/00 244/153 R |
| 8,247,912 B2 * | 8/2012 | Da Costa Duarte Pardal | F03D 5/00 290/44 |
| 8,253,265 B2 * | 8/2012 | Glass | F03D 1/04 290/44 |
| 8,350,403 B2 * | 1/2013 | Carroll | B64C 39/022 290/44 |
| 2002/0040948 A1 | 4/2002 | Ragner | |
| 2007/0176432 A1 * | 8/2007 | Rolt | B64C 39/022 290/55 |
| 2010/0013225 A1 | 1/2010 | Ippolito et al. | |
| 2010/0032948 A1 | 2/2010 | Bevirt | |
| 2010/0032956 A1 | 2/2010 | Varrichio et al. | |
| 2010/0221112 A1 | 9/2010 | Bevirt et al. | |
| 2010/0283253 A1 | 11/2010 | Bevirt | |
| 2010/0295303 A1 | 11/2010 | Lind et al. | |
| 2010/0295320 A1 | 11/2010 | Bevirt et al. | |
| 2011/0121570 A1 | 5/2011 | Bevirt et al. | |
| 2011/0127775 A1 | 6/2011 | Bevirt | |
| 2011/0180667 A1 | 7/2011 | O'Brien et al. | |
| 2011/0266395 A1 | 11/2011 | Bevirt | |
| 2011/0266809 A1 * | 11/2011 | Calverley | F03D 5/00 290/55 |
| 2012/0104763 A1 * | 5/2012 | Lind | B64C 31/06 290/55 |
| 2013/0221154 A1 | 8/2013 | Vander Lind et al. | |

\* cited by examiner

PATH BASED POWER GENERATION CONTROL FOR AN AERIAL VEHICLE

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

Methods and systems for managing power generation of an aerial vehicle operating in a crosswind-flight orientation are described herein. Beneficially, embodiments described herein may help mitigate overheating of components of the aerial vehicle by quickly reducing power generated by the aerial vehicle as it operates. Further, embodiments described herein may help to reduce fluctuations in power output as the aerial vehicle operates in crosswind flight.

In one aspect, a method may involve operating an aerial vehicle in a crosswind-flight orientation substantially along a first flight path to generate power. The first flight path may be constrained by a tether that defines a tether sphere having a radius based on a length of the tether. The aerial vehicle may be coupled to a ground station through the tether. The first flight path may be substantially on the tether sphere and may include a substantially circular path that allows the aerial vehicle to generate the power. The method may also involve, while the aerial vehicle is in the crosswind-flight orientation: determining to reduce the power being generated by the aerial vehicle and responsive to the determination, determining a different second flight path that will reduce the power generated by the aerial vehicle when operating on the second flight path. The second flight path may be substantially on the tether sphere. The method may further include operating the aerial vehicle substantially along the second flight path.

In another aspect, a system may include a tether coupled to a ground station, an aerial vehicle, and a control station. The aerial vehicle may be coupled to the tether. The aerial vehicle may be configured to operate in a crosswind-flight orientation substantially along a first flight path to generate power. The first flight path may be constrained by a tether that defines a tether sphere having a radius based on a length of the tether. The first flight path may be substantially on the tether sphere and may include a substantially circular path that allows the aerial vehicle to generate the power. The control system may be configured to: determine to reduce the power being generated by the aerial vehicle and responsive to the determination, determine a different second flight path that will reduce the power generated by the aerial vehicle when operating on the second flight path. The second flight path may be substantially on the tether sphere. The control system may further be configured to cause the aerial vehicle to operate substantially along the second flight path.

In another aspect, a system may include a tether coupled to a ground station, an aerial vehicle coupled to the tether, and a control system. The aerial vehicle may be configured to operate in a crosswind-flight orientation substantially along a first flight path to generate power. The first flight path may be constrained by a tether that defines a tether sphere having a radius based on a length of the tether. The first flight path may be substantially on the tether sphere and may include a substantially circular path that allows the aerial vehicle to generate the power. The control system may be configured to determine the power being generated by the aerial vehicle is greater than a rated power of the aerial vehicle. The rated power of the aerial vehicle may define a maximum power of the aerial vehicle. The control system may also be configured to, responsive to the determination, determine a different second flight path that will reduce the power generated by the aerial vehicle when operating on the second flight path. The second flight path may be substantially on the tether sphere.

In still another aspect, a system may include a means for operating an aerial vehicle in a crosswind-flight orientation substantially along a first flight path to generate power. The first flight path may be constrained by a tether that defines a tether sphere having a radius based on a length of the tether. The aerial vehicle may be coupled to a ground station through the tether. The first flight path may be substantially on the tether sphere and may include a substantially circular path that allows the aerial vehicle to generate the power. The system may also include a means for, while the aerial vehicle is in the crosswind-flight orientation: determining to reduce the power being generated by the aerial vehicle and responsive to the determination, determining a different second flight path that will reduce the power generated by the aerial vehicle when operating on the second flight path. The second flight path may be substantially on the tether sphere. The system may further include a means for operating the aerial vehicle substantially along the second flight path.

These as well as other aspects, advantages, and alternatives, will become apparent to those of ordinary skill in the art by reading the following detailed description, with reference where appropriate to the accompanying drawings.

DETAILED DESCRIPTION

Figure 1:
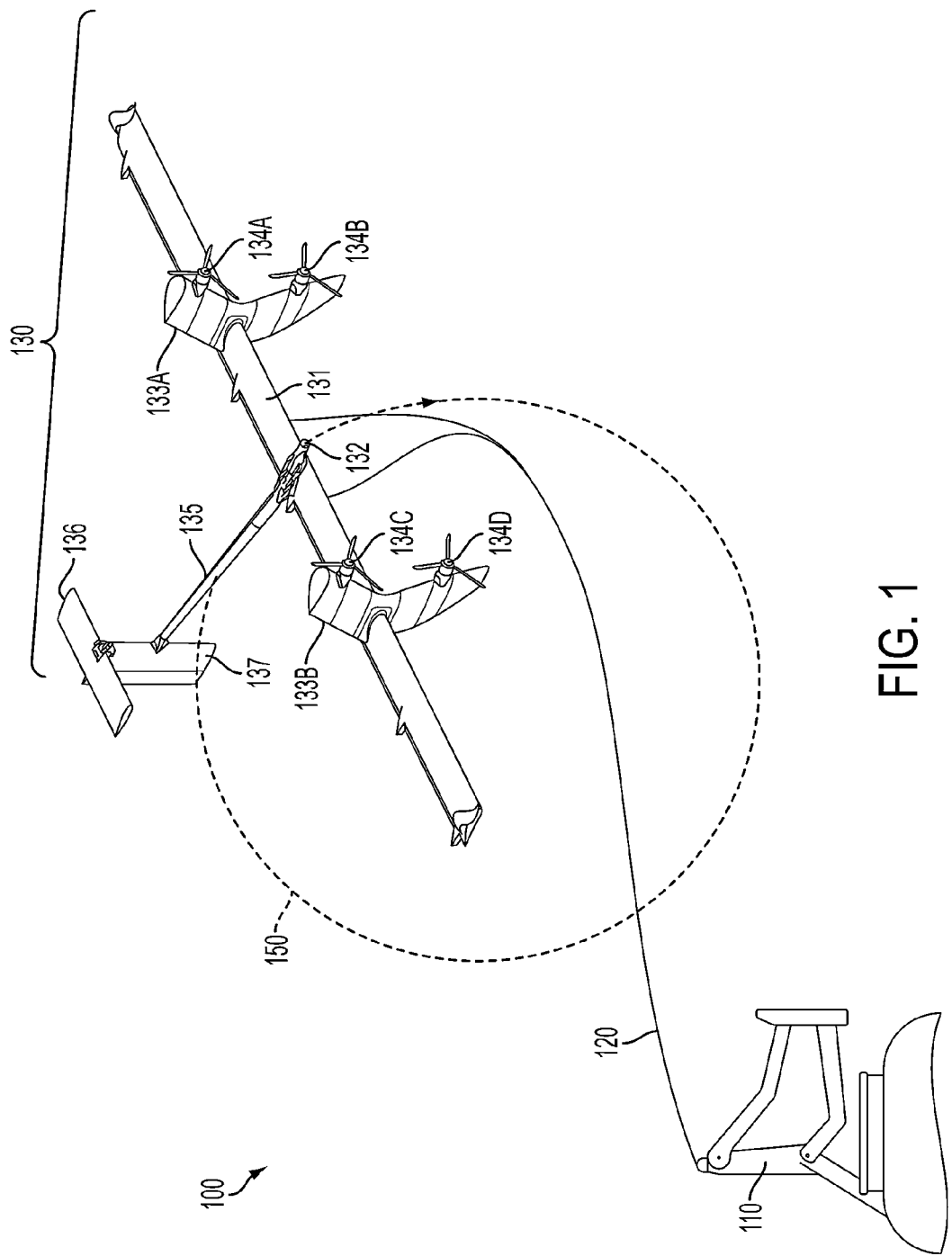
FIG. 1 depicts an Airborne Wind Turbine (AWT), according to an example embodiment.

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed methods systems and can be arranged and combined in a wide variety of different configurations, all of which are contemplated herein.

I. Overview

Illustrative embodiments relate to aerial vehicles, which may be used in a wind energy system, such as an Airborne Wind Turbine (AWT). In particular, illustrative embodiments may relate to or take the form of methods and systems for transitioning an aerial vehicle between certain flight modes that facilitate conversion of kinetic energy to electrical energy.

By way of background, an AWT may include an aerial vehicle that flies in a path, such as a substantially circular path, to convert kinetic wind energy to electrical energy. In an illustrative implementation, the aerial vehicle may be connected to a ground station via a tether. While tethered, the aerial vehicle can: (i) fly at a range of elevations and substantially along the path, and return to the ground, and (ii) transmit electrical energy to the ground station via the tether. (In some embodiments, the ground station may transmit electricity to the aerial vehicle for take-off and/or landing.)

In an AWT, an aerial vehicle may rest in and/or on a ground station (or perch) when the wind is not conducive to power generation. When the wind is conducive to power generation, such as when a wind speed may be 3.5 meters per second (m/s) at an altitude of 200 meters (m), the ground station may deploy (or launch) the aerial vehicle. In addition, when the aerial vehicle is deployed and the wind is not conducive to power generation, the aerial vehicle may return to the ground station.

Moreover, in an AWT, an aerial vehicle may be configured for hover flight and crosswind flight. Crosswind flight may be used to travel in a motion, such as a substantially circular motion, and thus may be the primary technique that is used to generate electrical energy. Hover flight in turn may be used by the aerial vehicle to prepare and position itself for crosswind flight. In particular, the aerial vehicle could ascend to a location for crosswind flight based at least in part on hover flight. Further, the aerial vehicle could take-off and/or land via hover flight.

In hover flight, a span of a main wing of the aerial vehicle may be oriented substantially parallel to the ground, and one or more propellers of the aerial vehicle may cause the aerial vehicle to hover over the ground. In some embodiments, the aerial vehicle may vertically ascend or descend in hover flight.

In crosswind flight, the aerial vehicle may be propelled by the wind substantially along a path, which as noted above, may convert kinetic wind energy to electrical energy. In some embodiments, the one or more propellers of the aerial vehicle may generate electrical energy by slowing down the incident wind.

The aerial vehicle may enter crosswind flight when (i) the aerial vehicle has attached wind-flow (e.g., steady flow and/or no stall condition (which may refer to no separation of air flow from an airfoil)) and (ii) the tether is under tension. Moreover, the aerial vehicle may enter crosswind flight at a location that is substantially downwind of the ground station.

In some embodiments, a tension of the tether during crosswind flight may be greater than a tension of the tether during hover flight. For instance, the tension of the tether during crosswind flight may be 15 kilonewtons (KN), and the tension of the tether during hover flight may be 1 KN.

In line with the discussion above, the aerial vehicle may generate electrical energy in crosswind flight and may thereby allow the AWT to extract useful power from the wind. The aerial vehicle may generate electrical energy during various environmental conditions such as high wind speeds, large gusts, turbulent air, or variable wind conditions. Generally, the inertial speed of the aerial vehicle, the tension of the tether, and the power output of the AWT increase as the wind speed increases. However, at times, it may be desirable to balance power generation of the AWT during various environmental conditions such as those noted above. Additionally, at other times, it may be desirable to reduce power generation to prevent over heating of components of the aerial vehicle.

Considering this, disclosed embodiments may allow for operating an aerial vehicle, of an AWT, in crosswind-flight in a manner that may balance power generation in variable wind conditions (e.g., during increasing wind speeds) or reduce power generation during high wind speeds. In an example embodiment, a method may involve operating an aerial vehicle in a crosswind-flight orientation substantially along a first flight path to generate power. The aerial vehicle may be connected to a tether that defines a tether sphere having a radius based on a length of the tether and may be connected to a ground station via the tether. As the aerial vehicle operates along the first flight path that is substantially on the tether sphere, in the crosswind-flight orientation, the aerial vehicle may determine a need to reduce power generation. Responsively, the aerial vehicle may determine a different second flight path that will allow the aerial vehicle to continue to operate in a crosswind-flight orientation and operates in a manner such that power generated by the aerial vehicle may be reduced. Accordingly, as noted above, embodiments described herein may help mitigate overheating of components of the aerial vehicle by quickly reducing power generated by the aerial vehicle as it operates. Additionally, embodiments described herein may help to reduce fluctuations in power output as the aerial vehicle operates in crosswind flight.

II. Illustrative Systems

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in hover flight, forward flight, crosswind flight.

In addition, the ground station 110 may include one or more components (not shown), such as a winch, that may vary a length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

The aerial vehicle 130 may be configured to fly substantially along a path 150 to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of a jelly bean, the shape of the number of 8, etc.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have one or more dimensions that correspond with a conventional wind turbine blade. As another example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced between the main wing 131. In some examples, a vertical spacing between corresponding rotors (e.g., rotor 134A and rotor 134B or rotor 134C and rotor 134D) may be 0.9 meters.

The rotors 134A-D may be configured to drive one or more generators for the purpose of generating electrical energy. In this example, the rotors 134A-D may each include one or more blades, such as three blades. The one or more rotor blades may rotate via interactions with the wind and which could be used to drive the one or more generators. In addition, the rotors 134A-D may also be configured to provide a thrust to the aerial vehicle 130 during flight. With this arrangement, the rotors 134A-D may function as one or more propulsion units, such as a propeller. Although the rotors 134A-D are depicted as four rotors in this example, in other examples the aerial vehicle 130 may include any number of rotors, such as less than four rotors or more than four rotors.

The tail boom 135 may connect the main wing 131 to the tail wing 136. The tail boom 135 may have a variety of dimensions. For example, the tail boom 135 may have a length of 2 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 2 meters. Moreover, in some examples, the tail wing 136 may have a surface area of 0.45 meters squared. Further, in some examples, the tail wing 136 may be located 1 meter above a center of mass of the aerial vehicle 130.

While the aerial vehicle 130 has been described above, it should be understood that the methods and systems described herein could involve any suitable aerial vehicle that is connected to a tether, such as the tether 120.

B. Illustrative Components of an AWT

Figure 2:
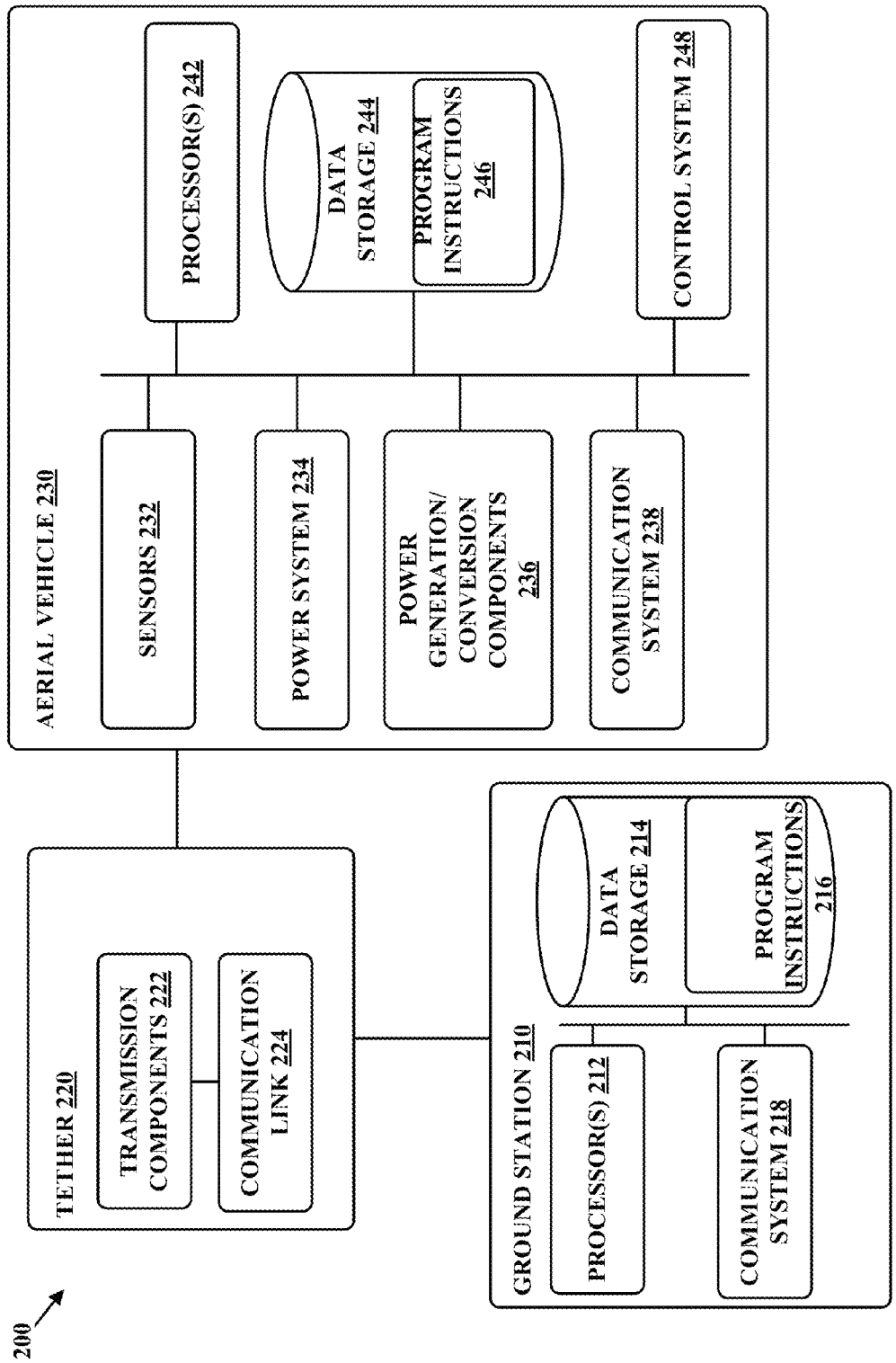
FIG. 2 is a simplified block diagram illustrating components of an AWT, according to an example embodiment.

FIG. 2 is a simplified block diagram illustrating components of the AWT 200. The AWT 200 may take the form of or be similar in form to the AWT 100. In particular, the AWT 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. The apparent/relative wind may be wind that is being applied to the aerial vehicle 230, for example. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples of sensors are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 326 could take various different forms in various different embodiments. For example, the power generation/conversion components 236 may include one or more generators, such as high-speed, direct-drive generators. With this arrangement, the one or more generators may be driven by one or more rotors, such as the rotors 134A-D. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 230 and/or the tether 110.

Figure 3A:
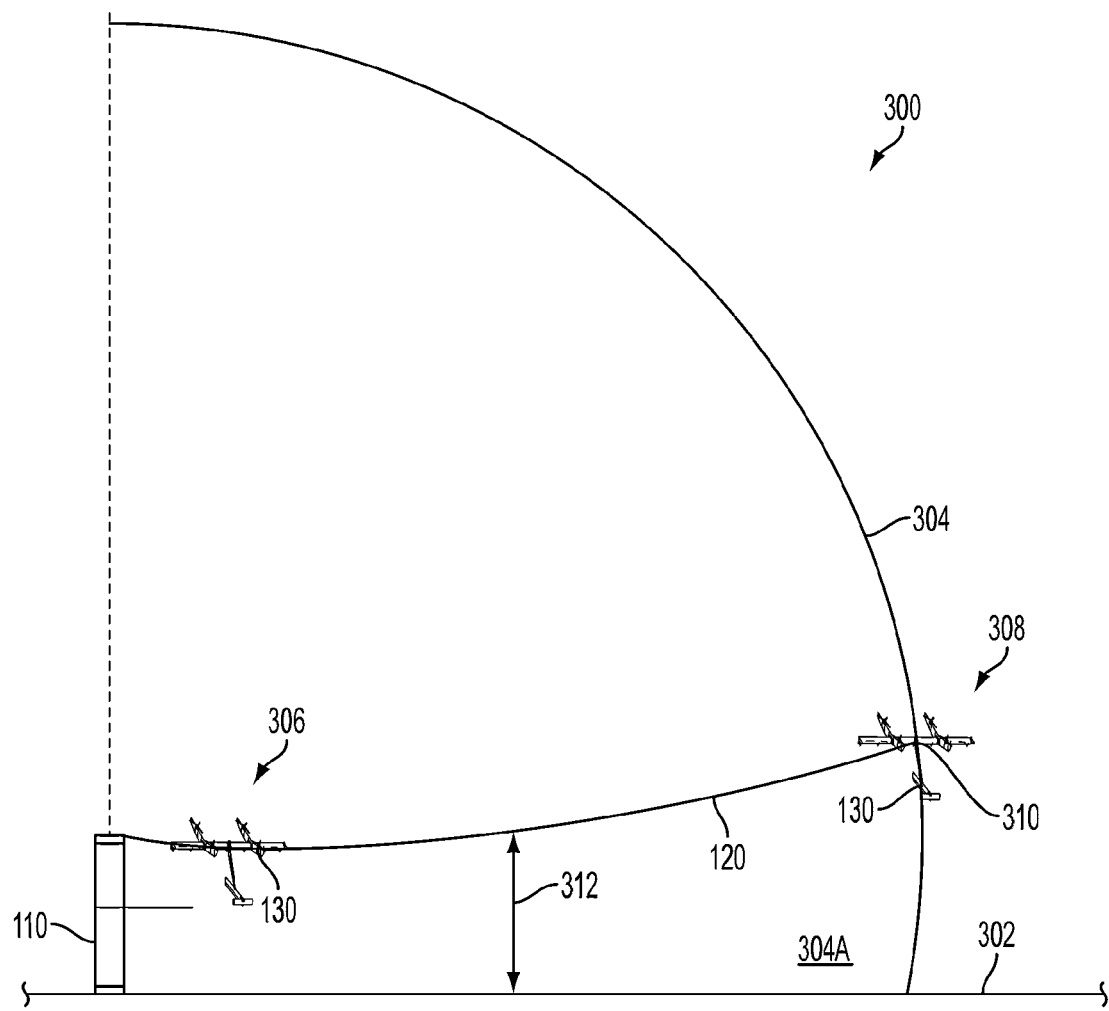
FIGS. 3A and 3B depict an example of an aerial vehicle transitioning from hover flight to crosswind flight, according to an example embodiment.
Figure 3B:
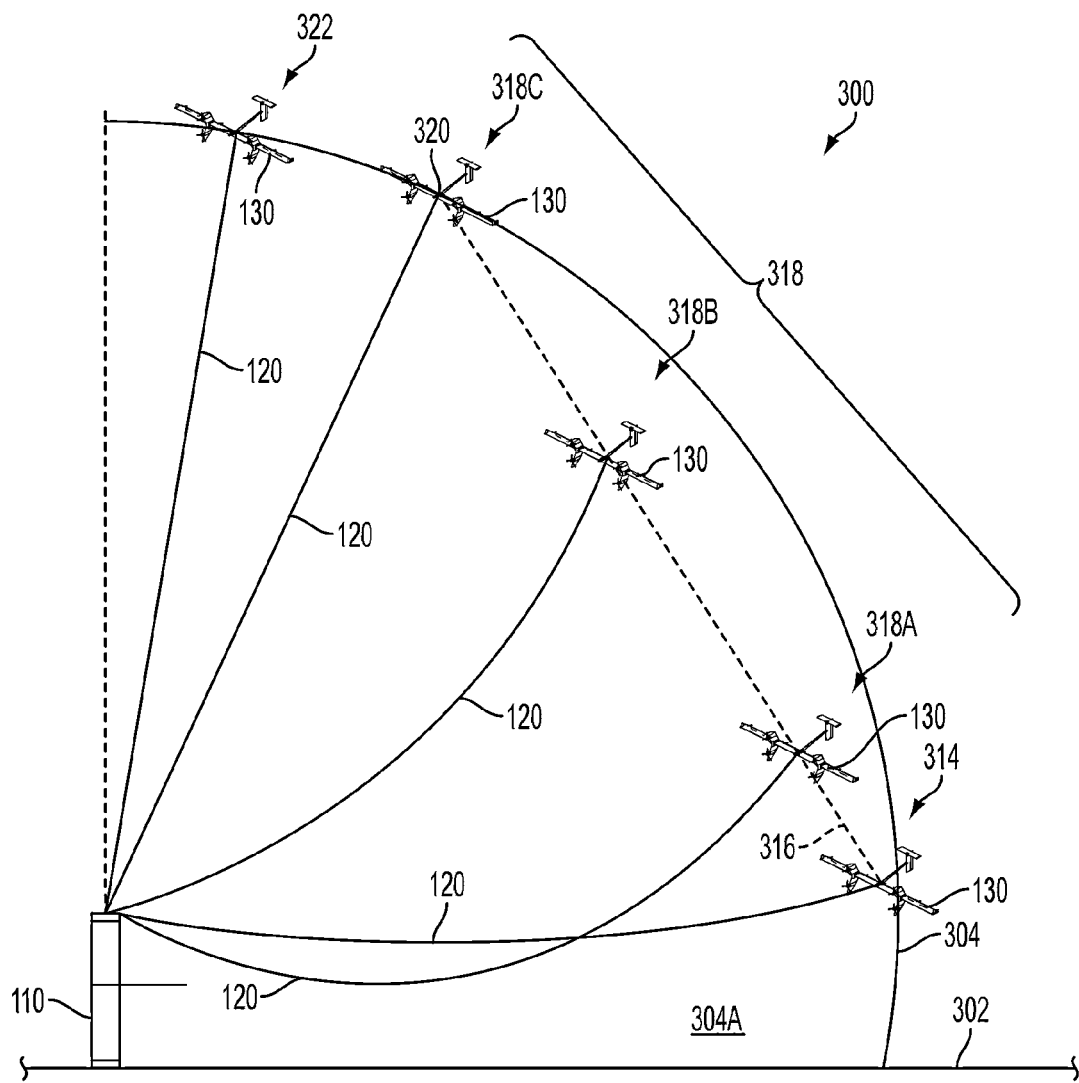

C. Transitioning an Aerial Vehicle from Hover Flight to Crosswind Flight to Generate Power FIGS. 3A and 3B depict an example 300 of transitioning an aerial vehicle from hover flight to crosswind flight in a manner such that power may be generated, according to an example embodiment. Example 300 is generally described by way of example as being carried out by the aerial vehicle 130 described above in connection with FIG. 1. For illustrative purposes, example 300 is described in a series of actions as shown in FIGS. 3A and 3B, though example 300 could be carried out in any number of actions and/or combination of actions.

As shown in FIG. 3A, the aerial vehicle 130 may be connected to the tether 120, and the tether 120 is connected to the ground station 110. The ground station 110 is located on ground 302. Moreover, as shown in FIG. 3A, the tether 120 defines a tether sphere 304 having a radius based on a length of the tether 120, such as a length of the tether 120 when it is extended. Example 300 may be carried out in and/or substantially on a portion 304A of the tether sphere 304. The term "substantially on," as used in this disclosure, refers to exactly on and/or one or more deviations from exactly on that do not significantly impact transitioning an aerial vehicle between certain flight modes as described herein.

Example 300 begins at a point 306 with deploying the aerial vehicle 130 from the ground station 110 in a hover-flight orientation. With this arrangement, the tether 120 may be paid out and/or reeled out. In some implementations, the aerial vehicle 130 may be deployed when wind speeds increase above a threshold speed (e.g., 3.5 m/s) at a threshold altitude (e.g., over 200 meters above the ground 302).

Further, at point 306 the aerial vehicle 130 may be operated in the hover-flight orientation. When the aerial vehicle 130 is in the hover-flight orientation, the aerial vehicle 130 may engage in hover flight. For instance, when the aerial vehicle engages in hover flight, the aerial vehicle 130 may ascend, descend, and/or hover over the ground 302. When the aerial vehicle 130 is in the hover-flight orientation, a span of the main wing 131 of the aerial vehicle 130 may be oriented substantially perpendicular to the ground 302. The term "substantially perpendicular," as used in this disclosure, refers to exactly perpendicular and/or one or more deviations from exactly perpendicular that do not significantly impact transitioning an aerial vehicle between certain flight modes as described herein.

Example 300 continues at a point 308 with while the aerial vehicle 130 is in the hover-flight orientation positioning the aerial vehicle 130 at a first location 310 that is substantially on the tether sphere 304. As shown in FIG. 3A, the first location 310 may be in the air and substantially downwind of the ground station 110.

The term "substantially downwind," as used in this disclosure, refers to exactly downwind and/or one or more deviations from exactly downwind that do not significantly impact transitioning an aerial vehicle between certain flight modes as described herein.

For example, the first location 310 may be at a first angle from an axis extending from the ground station 110 that is substantially parallel to the ground 302. In some implementations, the first angle may be 30 degrees from the axis. In some situations, the first angle may be referred to as azimuth, and the first angle may be between 30 degrees clockwise from the axis and 330 degrees clockwise from the axis, such as 15 degrees clockwise from the axis or 345 degrees clockwise from the axis.

As another example, the first location 310 may be at a second angle from the axis. In some implementations, the second angle may be 10 degrees from the axis. In some situations, the second angle may be referred to as elevation, and the second angle may be between 10 degrees in a direction above the axis and 10 degrees in a direction below the axis. The term "substantially parallel," as used in this disclosure refers to exactly parallel and/or one or more deviations from exactly parallel that do not significantly impact transitioning an aerial vehicle between certain flight modes described herein.

At point 308, the aerial vehicle 130 may accelerate in the hover-flight orientation. For example, at point 308, the aerial vehicle 130 may accelerate up to a few meters per second. In addition, at point 308, the tether 120 may take various different forms in various different embodiments. For example, as shown in FIG. 3A, at point 308 the tether 120 may be extended. With this arrangement, the tether 120 may be in a catenary configuration. Moreover, at point 306 and point 308, a bottom of the tether 120 may be a predetermined altitude 312 above the ground 302. With this arrangement, at point 306 and point 308 the tether 120 may not contact the ground 302.

Example 300 continues at point 314 with transitioning the aerial vehicle 130 from the hover-flight orientation to a forward-flight orientation, such that the aerial vehicle 130 moves from the tether sphere 304. As shown in FIG. 3B, the aerial vehicle 130 may move from the tether sphere 304 to a location toward the ground station 110 (which may be referred to as being inside the tether sphere 304).

When the aerial vehicle 130 is in the forward-flight orientation, the aerial vehicle 130 may engage in forward flight (which may be referred to as airplane-like flight). For instance, when the aerial vehicle 130 engages in forward flight, the aerial vehicle 130 may ascend. The forward-flight orientation of the aerial vehicle 130 could take the form of an orientation of a fixed-wing aircraft (e.g., an airplane) in horizontal flight. In some examples, transitioning the aerial vehicle 130 from the hover-flight orientation to the forward-flight orientation may involve a flight maneuver, such as pitching forward. And in such an example, the flight maneuver may be executed within a time period, such as less than one second.

At point 314, the aerial vehicle 130 may achieve attached flow. Further, at point 314, a tension of the tether 120 may be reduced. With this arrangement, a curvature of the tether 120 at point 314 may be greater than a curvature of the tether 120 at point 308. As one example, at point 314, the tension of the tether 120 may be less than 1 KN, such as 500 newtons (N).

Example 300 continues at one or more points 318 with operating the aerial vehicle 130 in the forward-flight orientation to ascend at an angle of ascent to a second location 320 that is substantially on the tether sphere 304. As shown in FIG. 3B, the aerial vehicle 130 may fly substantially along a path 316 during the ascent at one or more points 318. In this example, one or more points 318 is shown as three points, a point 318A, a point 318B, and a point 318C. However, in other examples, one or more points 318 may include less than three or more than three points.

In some examples, the angle of ascent may be an angle between the path 316 and the ground 302. Further, the path 316 may take various different forms in various different embodiments. For instance, the path 316 may be a line segment, such as a chord of the tether sphere 304.

As shown in FIG. 3B, the second location 320 may be in the air and substantially downwind of the ground station 110. The second location 320 may be oriented with respect to the ground station 110 the similar way as the first location 310 may be oriented with respect to the ground station 110.

For example, the second location 320 may be at a first angle from an axis extending from the ground station 110 that is substantially parallel to the ground 302. In some implementations, the first angle may be 30 degrees from the axis. In some situations, the first angle may be referred to as azimuth, and the angle may be between 30 degrees clockwise from the axis and 330 degrees clockwise from the axis, such as 15 degrees clockwise from the axis or 345 degrees clockwise from the axis.

In addition, as shown in FIG. 3B, the second location 320 may be substantially upwind of the first location 310. The term "substantially upwind," as used in this disclosure, refers to exactly upwind and/or one or more deviations from exactly upwind that do not significantly impact transitioning an aerial vehicle between certain flight modes as described herein.

At one or more points 318, a tension of the tether 120 may increase during the ascent. For example, a tension of the tether 120 at point 318C may be greater than a tension of the tether 120 at point 318B, a tension of the tether 120 at point 318B may be greater than a tension of the tether 120 at point 318A. Further, a tension of the tether 120 at point 318A may be greater than a tension of the tether at point 314.

With this arrangement, a curvature of the tether 120 may decrease during the ascent. For example, a curvature the tether 120 at point 318C may be less than a curvature the tether at point 318B, and a curvature of the tether 120 at point 318B may be less than a curvature of the tether at point 318A. Further, in some examples, a curvature of the tether 120 at point 318A may be less than a curvature of the tether 120 at point 314.

Example 300 continues at a point 322 with transitioning the aerial vehicle 130 from the forward-flight orientation to a crosswind-flight orientation. In some examples, transitioning the aerial vehicle 130 from the forward-flight orientation to the crosswind-flight orientation may involve a flight maneuver. When the aerial vehicle 130 is in the crosswind-flight orientation, the aerial vehicle 130 may engage in crosswind flight. For instance, when the aerial vehicle 130 engages in crosswind flight, the aerial vehicle 130 may fly substantially along a path, such as path 150, to generate electrical energy. In some implementations, a natural roll and/or yaw of the aerial vehicle 130 may occur during crosswind flight.

Figure 3C:
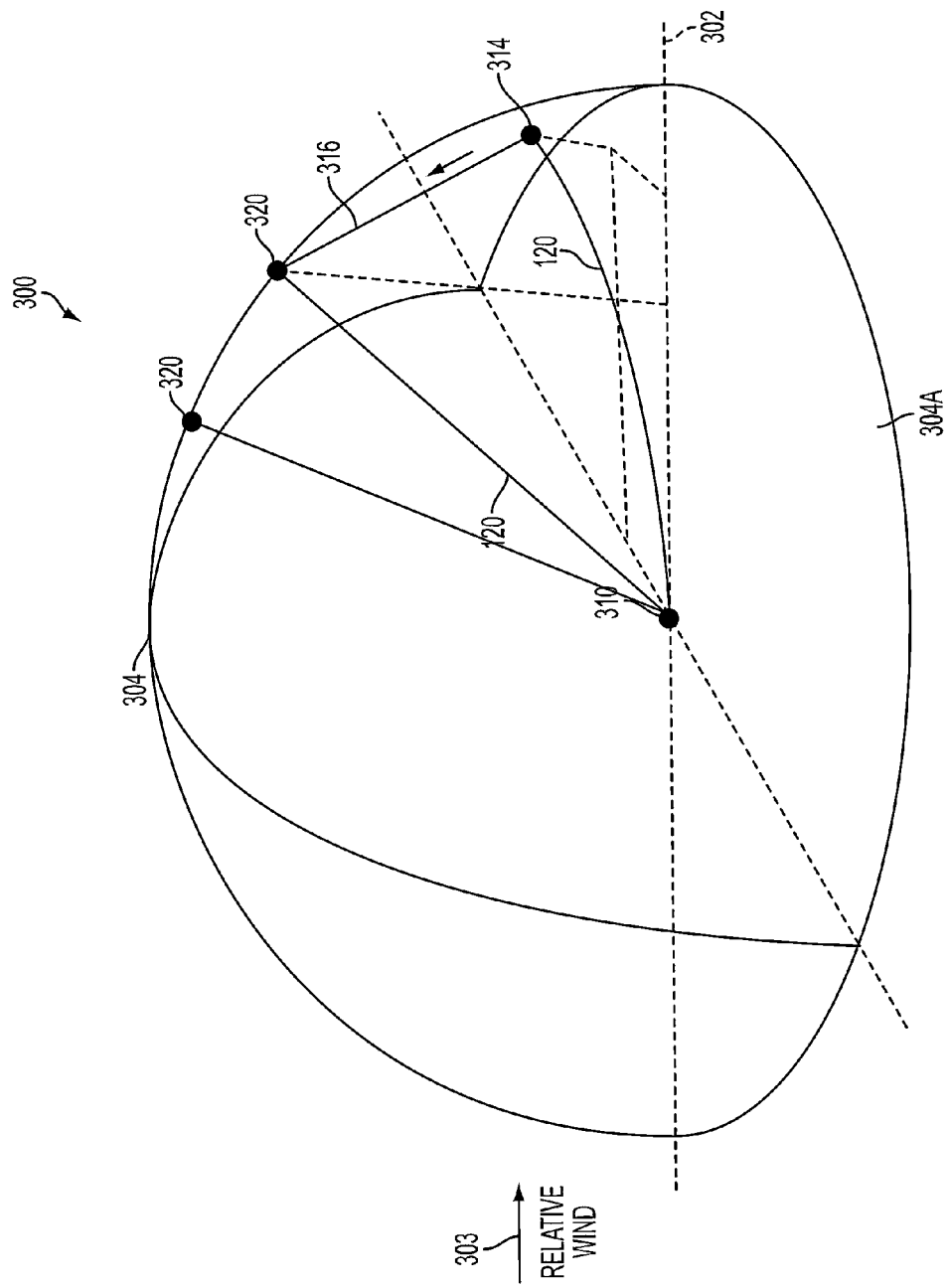
FIG. 3C depicts an example of an aerial vehicle transitioning from hover flight to crosswind flight in a tether sphere, according to an example embodiment.

FIG. 3C depicts example 300 from a three-dimensional (3D) perspective. Accordingly, like numerals may denote like entities. As noted above, tether sphere 304 has a radius based on a length of a tether 120, such as a length of the tether 120 when it is extended. Also as noted above, in FIG. 3C, the tether 120 is connected to ground station 310, and the ground station 310 is located on ground 302. Further, relative wind 303 contacts the tether sphere 304. Note, in FIG. 3C, only a portion of the tether sphere 304 that is above the ground 302 is depicted. The portion may be described as one half of the tether sphere 304.

As shown in FIG. 3C, the first portion 304A of the tether sphere 304 is substantially downwind of the ground station 310. In FIG. 3C, the first portion 304A may be described as one quarter of the tether sphere 304.

Like FIG. 3B, FIG. 3C depicts transitioning aerial vehicle 130 (not shown in FIG. 3C to simply the Figure) between hover flight and crosswind flight. As shown in FIG. 3C, when the aerial vehicle 130 transitions from the hover-flight orientation to a forward-flight orientation, the aerial vehicle may be positioned at a point 314 that is inside the first portion 304A of the tether sphere 304. Further still, as shown in FIG. 3C, when aerial vehicle 130 ascends in the forward-flight orientation to a location 320 that is substantially on the first portion 304A of the tether sphere 304, the aerial vehicle may follow a path 316. Yet even further, as shown in FIG. 3C, aerial vehicle 130 may then transition from location 320 in a forward-flight orientation to a crosswind-flight orientation at location 322, for example.

III. Illustrative Methods

Figure 4:
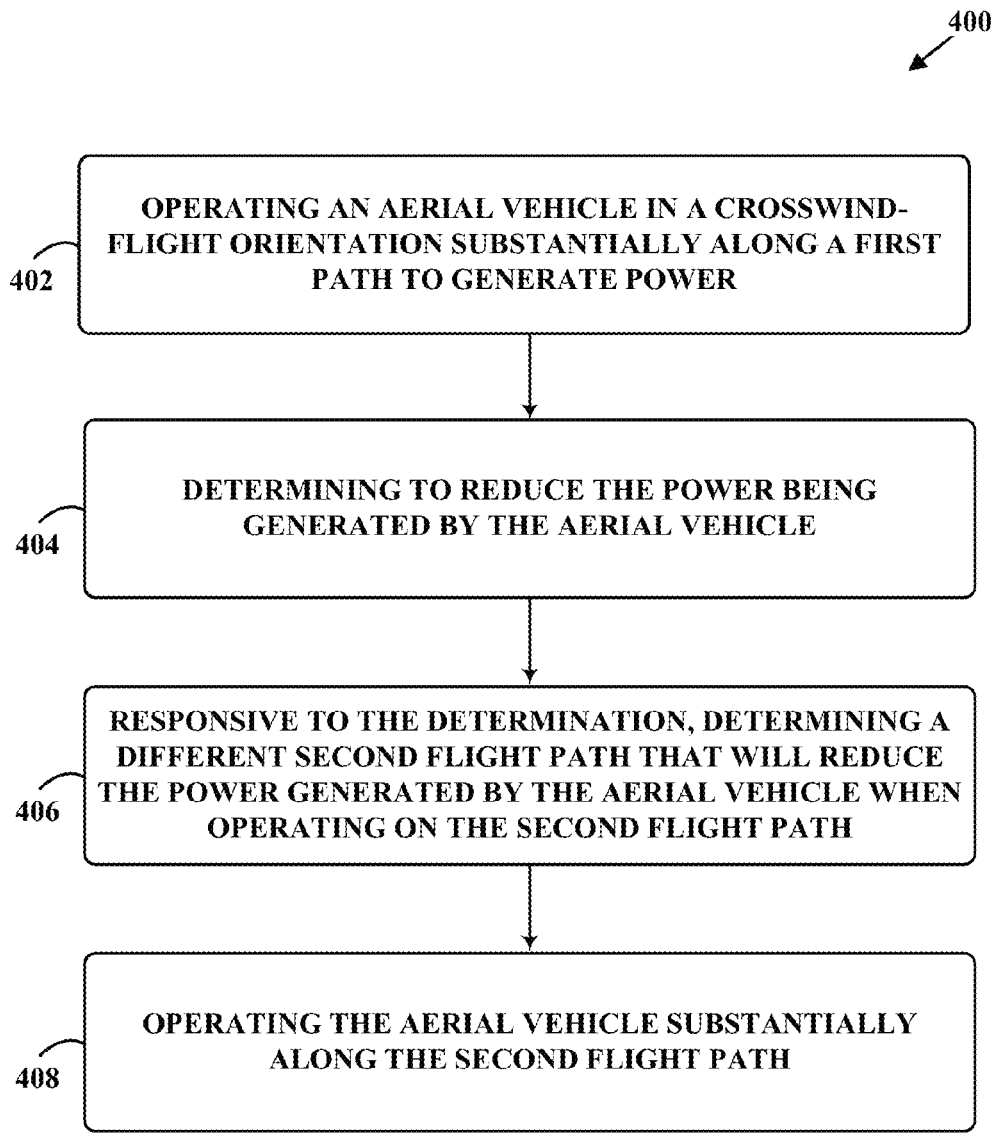
FIG. 4 is a flowchart of a method, according to an example embodiment.

FIG. 4 is a flowchart illustrating a method 400, according to an example embodiment. The method 400 may be used to control power generation of an aerial vehicle in a crosswind-flight orientation. Illustrative methods, such as method 400, may be carried out in whole or in part by a component or components of an aerial vehicle, such as by the one or more components of the aerial vehicle 130 shown in FIG. 1, the aerial vehicle 230 shown in FIG. 2, the ground station 110 shown in FIG. 1, and the ground station 210 shown in FIG. 2. For instance, method 400 may be performed by the control system 248. For simplicity, method 400 may be described generally as being carried out by an aerial vehicle, such as the aerial vehicle 130 and/or the aerial vehicle 230. However, it should be understood that example methods, such as method 400, may be carried out by other entities or combinations of entities without departing from the scope of the disclosure.

As shown by block 402, method 400 involves operating an aerial vehicle in a crosswind-flight orientation substantially along a first flight path that may allow the aerial vehicle to generate power. The first flight path may be constrained by a tether such as tether 120 and, as noted above, the tether may define a tether sphere having a radius based on a length of the tether. For example, the tether sphere may be the same as or similar to tether sphere 304 of FIGS. 3A-3C. The first flight path may be substantially on the tether sphere and may include a substantially circular path (e.g., path 150) that allows the aerial vehicle to generate the power. For example, the first flight path may be located at a position of the tether sphere the same as or similar to that of 322 in FIGS. 3A and 3C.

Within this disclosure, the term "substantially circular" refers to exactly circular and/or one or more deviations from exactly circular that does not significantly impact the aerial vehicle from generating power. Substantially circular paths may include, for example, oval-shaped paths, balloon-shaped paths, and bowl-shaped paths to name a few. Other substantially circular paths are possible as well.

To begin operating along the first flight path, the aerial vehicle may be deployed, may engage in hover flight, may engage in forward flight, and may then transition to the first flight path on the tether sphere. For example, at block 402, the aerial vehicle may be operated in the same or a similar way as the aerial vehicle 130 may be operated when transitioning from a hover flight orientation to a crosswind flight orientation as described with reference to example 300 of FIGS. 3A-3C. Accordingly, when operating along the first flight path in the crosswind-flight orientation, the aerial vehicle may be oriented the same as or similar to aerial vehicle 130 at point 322 of FIGS. 3B and 3C.

Note, in other examples, some of the above referenced flight maneuvers may be omitted. For instance, in some examples, the aerial vehicle may be deployed, engage in forward flight to a position on the tether sphere, and thereafter immediately transition to the first flight path. Thus, in such examples, the aerial vehicle may omit the hover flight maneuver.

Figure 5A:
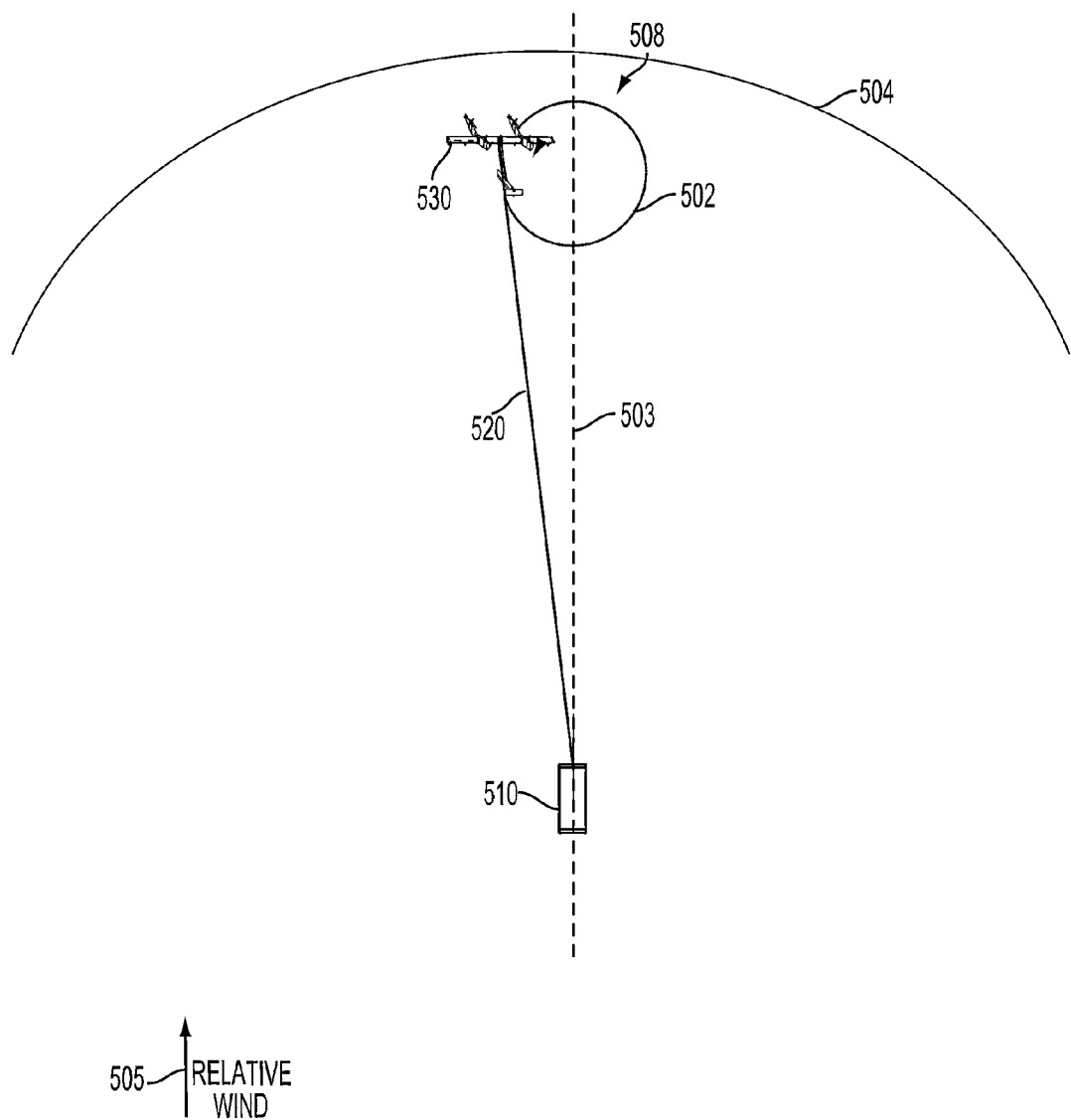
FIGS. 5A and 5B depict an example of an aerial vehicle transitioning from a first flight path to a second flight path, according to an example embodiment.
Figure 5B:
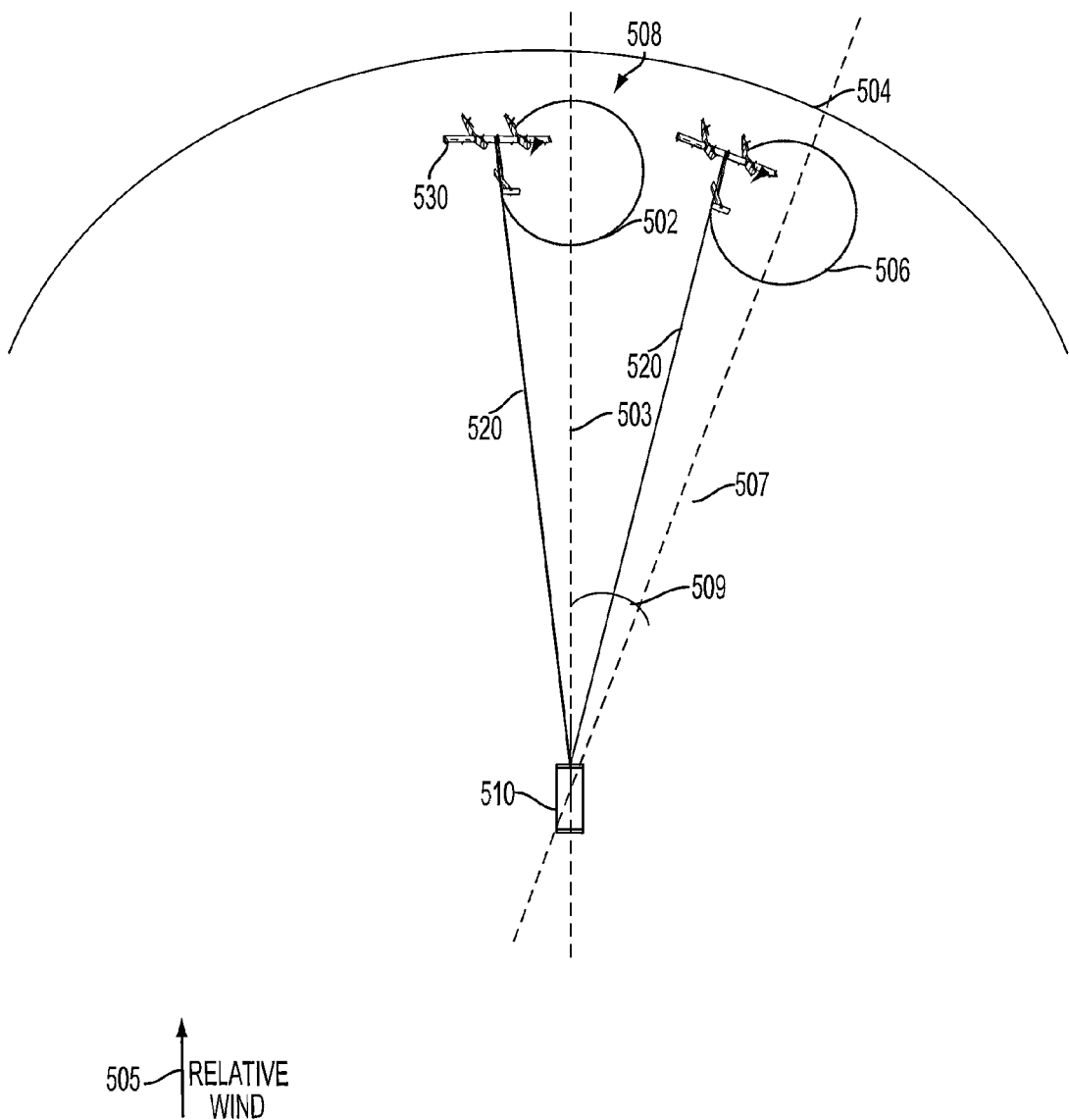

In one example, as shown in FIGS. 5A and 5B, an aerial vehicle 530 may be operating in a crosswind-flight orientation along flight path 502 substantially on a tether sphere 504. FIG. 5A illustrates an isometric view of aerial vehicle 530 operating in crosswind-flight orientation along flight path 502 from a perspective that is above and behind ground station 510. In FIG. 5A, flight path 502 may be the same as or similar to flight path 150 and tether sphere 504 may be the same as or similar to tether sphere 304, for example.

In FIG. 5A, an axis 503 may extend from the ground station 510 to flight path 502 and may intersect with flight path 502. Axis 503 may be oriented substantially parallel to the ground (not shown in FIG. 5A) and flight path 502 may be substantially downwind (in accordance with relative wind 503) from ground station 510. Aerial vehicle 530 may operate along flight path 502 in a manner such that it generates power. In some examples, flight path 502 may allow aerial vehicle 530 to generate a maximum power.

As shown by block 404, method 400 involves while the aerial vehicle is in the crosswind-flight orientation, determining to reduce the power being generated by the aerial vehicle. The aerial vehicle may determine to reduce the power being generated based on a general desire to become less efficient in generating power. For instance, as noted throughout this disclosure, the aerial vehicle may desire to produce less power to prevent overheating various components of the aerial vehicle or to maintain a certain power level despite, for example, increasing wind conditions.

In one example, determining to reduce the power being generated by the aerial vehicle may be made for example, based on a temperature of a component of the aerial vehicle. For example, using a thermometer or other heat measuring mechanism of sensors 232, the aerial vehicle may determine that a temperature or heat threshold of the component (e.g., a motor) is too high. Based on this determination, the aerial vehicle may determine that too much power is being generated and provided to the component. Responsively, the aerial vehicle may determine to reduce power generation.

In another example, block 404 may involve determining that the power being generated by the aerial vehicle is greater than a rated power of the aerial vehicle. The rated power of the vehicle may define a maximum power that may be generated by the aerial vehicle. Upon determining that the aerial vehicle is generating rated power, the aerial vehicle may determine to reduce power generation to, for example, prevent or mitigate the overheating of components, such as motors.

In some examples, determining the aerial vehicle is generating rated power may be performed by measuring the wind speed (e.g., using pitot tubes of sensors 232) being applied to the aerial vehicle. The wind speed that may be measured may be the wind at speeds conducive to power generation (i.e., above a wind speed threshold), such as wind speeds of 3.5 meters per second. Because power generation is a function of wind speed, in examples in which the wind speed is equivalent to a rated power wind speed (e.g., speeds of 11.5 meters per second) then the aerial vehicle may determine it may be generating max power and may responsively determine to reduce power generation prior to encountering overheating, for example.

Returning to the example of FIG. 5A, aerial vehicle 530 may determine to reduce power being generated by aerial vehicle 530 as it travels around flight path 502. Aerial vehicle may employ any of the methods noted above using, for example, a control system the same as or similar to control system 248. In other examples, the determination to reduce power may be made by the ground station 510 and communicated to aerial vehicle 530. In further examples, the determination may be made using operations of both aerial vehicle 530 and ground station 510.

In response to the determination made at block 404, as shown by block 406, method 400 involves determining a different second flight path that will reduce the power generated by the aerial vehicle when operating on the second flight path. Similar to block 404, block 406 may be performed while the aerial vehicle is in a crosswind-flight orientation. The second flight path may be substantially on the same tether sphere as the first flight path and may be substantially circular in shape as well.

In some examples, determining the second flight path may include determining a wind speed of apparent wind-flow being applied to the aerial vehicle. Based on the wind speed of the apparent wind-flow being applied to the aerial vehicle the second flight path may be determined. Because power generated by the aerial vehicle is a function of wind speed, the power generation may be reduced based on the wind speed. More specifically, for example, the aerial vehicle may determine the relative wind speed of the apparent wind-flow being applied to the aerial vehicle. Based on the determination, the aerial vehicle may determine a variation angle and using the variation angle may vary the second flight path in a manner such that the second flight path is varied from the first flight path at the variation angle. Thus, the determined second flight path may be varied from being substantially downwind of the ground station.

Continuing with the example of FIGS. 5A and 5B, after determining to reduce the amount of power being generated, aerial vehicle 530 may determine a second flight path 506, as shown in FIG. 5B, that aerial vehicle may operate on to reduce power generation. Similar to flight path 502, flight path 506 may include a second axis 507 that may extend from the ground station 510 to flight path 506 and may intersect with flight path 506. Axis 507 may be oriented substantially parallel to the ground (not shown in FIG. 5B).

To determine flight path 506, aerial vehicle 530 may measure the wind speed of relative wind 505 and based on the measurement determine a variation angle 509 at which to vary the axis 507 of flight path 506. Once determined, axis 507 may be varied from axis 503 at the variation angle, as shown in FIG. 5B. Resultantly, the second flight path 507 may be varied from being substantially downwind of ground station 510. In FIG. 5B, second axis 507 is varied from first axis 503 at angle 509 in a clockwise direction or to the right. However, this variation is intended to be an example only, in other examples the variation may be above, below, or to the left of the first axis 503.

Similar to determining to reduce the power, aerial vehicle 530 may determine the second flight path using, for example, a control system the same as or similar to control system 248. In other examples, the second flight path may be determined by the ground station 510 and communicated to aerial vehicle 530. In further examples, the determination may be made using operations of both aerial vehicle 530 and ground station 510.

As shown by block 408, method 400 involves operating the aerial vehicle substantially along the second flight path. Like blocks 404 and 406, block 408 may be performed while aerial vehicle 530 is in a crosswind-flight orientation. At block 408, the aerial vehicle may be transitioned from first flight path 502 to second flight path 506 in the same way or a similar way as the aerial vehicle 130 may be transitioned from location 320 to location 322 as described with reference to FIGS. 3B and 3C.

IV. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A method comprising:
operating an aerial vehicle in a crosswind-flight orientation substantially along a first flight path to generate power, wherein the first flight path is constrained by a tether that defines a tether sphere having a radius based on a length of the tether, wherein the aerial vehicle is coupled to a ground station through the tether, and wherein the first flight path is substantially on the tether sphere and allows the aerial vehicle to generate the power; and
while the aerial vehicle is in the crosswind-flight orientation:
determining that a wind speed of apparent wind-flow being applied to the aerial vehicle is above a wind speed threshold, wherein the wind speed threshold corresponds to a maximum power that may be generated by the aerial vehicle;
responsive to the determination, determining a different second flight path; and operating the aerial vehicle substantially along the different second flight path.

2. The method of claim 1, further comprising:
determining to reduce the power being generated by the aerial vehicle, wherein determining to reduce the power being generated by the aerial vehicle comprises determining to reduce the power being generated based on a temperature of a component of the aerial vehicle.

3. The method of claim 1, further comprising:
determining to reduce the power being generated by the aerial vehicle, wherein determining to reduce the power being generated by the aerial vehicle comprises determining the power being generated by the aerial vehicle is greater than a rated power of a component of the aerial vehicle, wherein the rated power of the component defines a maximum power of the component of the aerial vehicle.

4. The method of claim 1, wherein determining the different second flight path thereby reduces the power generated by the aerial vehicle when operating on the different second flight path,
wherein the apparent wind-flow being applied to the aerial vehicle includes a steady downwind airflow, and
wherein the different second flight path is substantially on the tether sphere.

5. The method of claim 1,
wherein a first axis intersects the flight path and a second axis intersects the different second flight path, wherein the first axis extends from the ground station and is oriented substantially parallel to a ground to which the ground station is affixed, wherein the first flight path is oriented substantially downwind of the ground station,
wherein the second axis intersects the different second flight path, wherein the second axis extends from the ground station and is oriented at an angle from the first axis, and wherein the different second flight path is varied from being substantially downwind of the ground station.

6. The method of claim 1,
wherein a first axis intersects the flight path and a second axis intersects the different second flight path, wherein the first axis extends from the ground station and is oriented substantially parallel to a ground to which the ground station is affixed, wherein the first flight path is oriented substantially downwind of the ground station, wherein the apparent wind-flow being applied to the aerial vehicle includes a steady downwind airflow, and
wherein determining the different second flight path further comprises:
based on the determination of the wind speed of apparent wind-flow being applied to the aerial vehicle, determining a variation angle; and
varying the second axis in a manner such that the second axis is varied from the first axis at the variation angle.

7. The method of claim 6, wherein varying the second axis comprises varying the second axis in a manner such that it is oriented to the left of the first axis at the variation angle from the first axis.

8. The method of claim 6, wherein varying the second axis comprises varying the second axis in a manner such that it is oriented to the right of the first axis at the variation angle from the first axis.

9. The method of claim 6, wherein varying the second axis comprises varying the second axis in a manner such that it is oriented below the first axis at the variation angle from the first axis.

10. The method of claim 6, wherein varying the second axis comprises varying the second axis in a manner such that it is oriented above the first axis at the variation angle from the first axis.

11. A system comprising:
a tether coupled to a ground station;
an aerial vehicle coupled to the tether, wherein the aerial vehicle is configured to operate in a crosswind-flight orientation substantially along a first flight path to generate power, wherein the first flight path is constrained by the tether that defines a tether sphere having a radius based on a length of the tether, and wherein the first flight path is substantially on the tether sphere and allows the aerial vehicle to generate the power; and
a control system configured to:
determine that a wind speed of apparent wind-flow being applied to the aerial vehicle is above a wind speed threshold, wherein the wind speed threshold corresponds to a maximum power that may be generated by the aerial vehicle;
responsive to the determination, determine a different second flight path; and
cause the aerial vehicle to operate substantially along the different second flight path.

12. The system of claim 11, wherein the control system is further configured to determine to reduce the power being generated by the aerial vehicle based on a temperature of a component of the aerial vehicle.

13. The system of claim 11, wherein the control system is further configured to determine the power being generated by the aerial vehicle is greater than a rated power of the aerial vehicle, wherein the rated power of the aerial vehicle defines a maximum power of the aerial vehicle, and to determine to reduce the power being generated by the aerial vehicle.

14. The system of claim 11, wherein the apparent wind-flow being applied to the aerial vehicle includes a steady downwind airflow, and wherein the different second flight path is substantially on the tether sphere.

15. The system of claim 11,
wherein a first axis intersects the flight path and a second axis intersects the different second flight path, wherein the first axis extends from the ground station and is oriented substantially parallel to a ground to which the ground station is affixed, wherein the first flight path is oriented substantially downwind of the ground station,
wherein the second axis intersects the different second flight path, wherein the second axis extends from the ground station and is oriented at an angle from the first axis, and wherein the different second flight path is varied from being substantially downwind of the ground station.

16. The system of claim 15, wherein the apparent wind-flow being applied to the aerial vehicle includes a steady downwind airflow, and
wherein the control system is further configured to:
based on the determination of the wind speed of apparent wind-flow being applied to the aerial vehicle, determine a variation angle; and
vary the second axis in a manner such that the second axis is varied from the first axis at the variation angle.

17. A system comprising:
a tether coupled to a ground station;
an aerial vehicle coupled to the tether, wherein the aerial vehicle is configured to operate in a crosswind-flight orientation substantially along a first flight path to generate power, wherein the first flight path is constrained by the tether that defines a tether sphere having a radius based on a length of the tether, and wherein the first flight path is substantially on the tether sphere and allows the aerial vehicle to generate the power; and a control system configured to:
- determine that a wind speed of apparent wind-flow being applied to the aerial vehicle is above a wind speed threshold, wherein the wind speed threshold corresponds to a maximum power that may be generated by the aerial vehicle; and
- responsive to the determination, determine a different second flight path.

18. The system of claim 17, wherein the control system is further configured to cause the aerial vehicle to operate substantially along the different second flight path.

19. The system of claim 17,
wherein a first axis intersects the flight path and a second axis intersects the different second flight path, wherein the first axis extends from the ground station and is oriented substantially parallel to a ground to which the ground station is affixed, wherein the first flight path is oriented substantially downwind of the ground station, wherein the second axis intersects the different second flight path, wherein the second axis extends from the ground station and is oriented at an angle from the first axis, and wherein the different second flight path is varied from being substantially downwind of the ground station.

20. The system of claim 19, wherein the apparent wind-flow being applied to the aerial vehicle includes a steady downwind airflow, and wherein the control system is further configured to:
- based on the determination of the wind speed of apparent wind-flow being applied to the aerial vehicle, determine the angle; and
- determine the power being generated by the aerial vehicle is greater than a rated power of the aerial vehicle, wherein the rated power of the aerial vehicle defines a maximum power of the aerial vehicle.

* * * * *